United States Patent [19]
Yabe

[11] Patent Number: 5,907,415
[45] Date of Patent: May 25, 1999

[54] IMAGE PROCESSING APPARATUS WITH COLOR GAMUT DEPENDENT ON COLOR MODE

[75] Inventor: Takashi Yabe, Yokohama, Japan

[73] Assignee: Canon Kabushiki Kaisha, Tokyo, Japan

[21] Appl. No.: 08/766,881

[22] Filed: Dec. 13, 1996

[30] Foreign Application Priority Data

Dec. 15, 1995 [JP] Japan ................................... 7-327206

[51] Int. Cl.$^6$ ........................................................ H04N 1/60
[52] U.S. Cl. ............................ 358/518; 358/504; 382/167
[58] Field of Search ................................... 382/162, 167; 395/101, 109, 131; 358/501, 504, 518, 580, 519, 530, 448

[56] References Cited

U.S. PATENT DOCUMENTS

| | | | |
|---|---|---|---|
| 5,367,318 | 11/1994 | Beaudin et al. ........................ | 345/201 |
| 5,450,216 | 9/1995 | Kasson .................................... | 358/518 |
| 5,572,632 | 11/1996 | Laumeyer et al. ...................... | 395/116 |
| 5,604,610 | 2/1997 | Spaulding et al. ...................... | 358/525 |
| 5,712,925 | 1/1998 | Ohga ...................................... | 382/167 |

*Primary Examiner*—Peter S. Wong
*Assistant Examiner*—Derek J. Jardieu
*Attorney, Agent, or Firm*—Fitzpatrick, Cella, Harper & Scinto

[57] ABSTRACT

An image processor includes an input device that inputs image data representing a target image, and a color gamut mapping device that performs a color gamut mapping process. The image processor also includes a color reproduction process device that performs a color reproduction process, and a judgement device that judges whether a monochromatic mode for forming an image on a recording medium is set. A controller controls the color gamut mapping device and the color reproduction device, with the controller inhibiting the color gamut mapping device from performing a color mapping process on the input image data when a judgment is made that the monochromatic color mode is set.

8 Claims, 5 Drawing Sheets

IMAGE PROCESSING APPARATUS WITH COLOR GAMUT DEPENDENT ON COLOR MODE

BACKGROUND OF THE INVENTION

1. Field of the Invention

The present invention relates to an image processing apparatus and method for performing a color gamut mapping process (or color space compression process).

2. Related Background Art

In recent years, it has been thought a color gamut mapping technique which converts input image data including image data outside a color reproduction gamut (or range) of an output device into optimal image data within the color reproduction gamut of the output device.

However, since a color gamut mapping process has been conventionally performed irrespective of a mode to be set, there has been a problem that a process suitable for each mode is sometimes impossible.

SUMMARY OF THE INVENTION

The present invention was made in consideration of the above-described problem, and therefore an object of the present invention is to perform an image process capable of producing a high-quality image, by controlling a color gamut mapping process in accordance with a mode which has been set.

In order to achieve the above object, the present invention comprises the following structure.

That is, a first aspect of the invention comprises:

input means for inputting image data representing a target image;

color gamut mapping means for performing a color gamut mapping process for the input image data;

judgment means for judging whether the image process is to be performed in a plural-color mode or in a monochromatic mode, in the plural-color mode the image process being performed for the input image data so as to form an image on a recording medium by using a plurality of recording materials; and control means for controlling the color gamut mapping means on the basis of a judged result of said judgment means.

Further, a second aspect of the invention comprises:

input means for inputting image data representing a target image;

color gamut mapping means for performing a color gamut mapping process for the input image data;

spatial frequency characteristic conversion means for converting a spatial frequency characteristic for the input image data;

judgment means for judging whether the image process is to be performed in a plural-color mode or in a monochromatic mode, in the plural-color mode the image process being performed for the input image data so as to form an image on a recording medium by using a plurality of recording materials;

color gamut mapping control means for controlling the color gamut mapping means for each target image, on the basis of a judged result of the judgment means; and spatial frequency characteristic conversion control means for judging a characteristic of the image data input by the input means and controlling the spatial frequency characteristic conversion means for each input image data.

Another object of the present invention is to compensate reproducibility of a dark portion according to user's use, by a color gamut mapping process.

In order to achieve the above object, the present invention provides an image processing apparatus which comprises:

input means for inputting image data representing a target image;

instruction means for instructing a color gamut mapping quantity for a dark portion, on the basis of a manual instruction;

setting means for setting a color gamut mapping process parameter on the basis of the color gamut mapping quantity for the dark portion; and color gamut mapping process means for performing the color gamut mapping process for the input image data on the basis of the color gamut mapping process parameter.

The above and other objects of the present invention will become apparent from the following detailed description when read in conjunction with the accompanying drawings.

DETAILED DESCRIPTION OF THE PREFERRED EMBODIMENTS

First Embodiment

Figure 1:
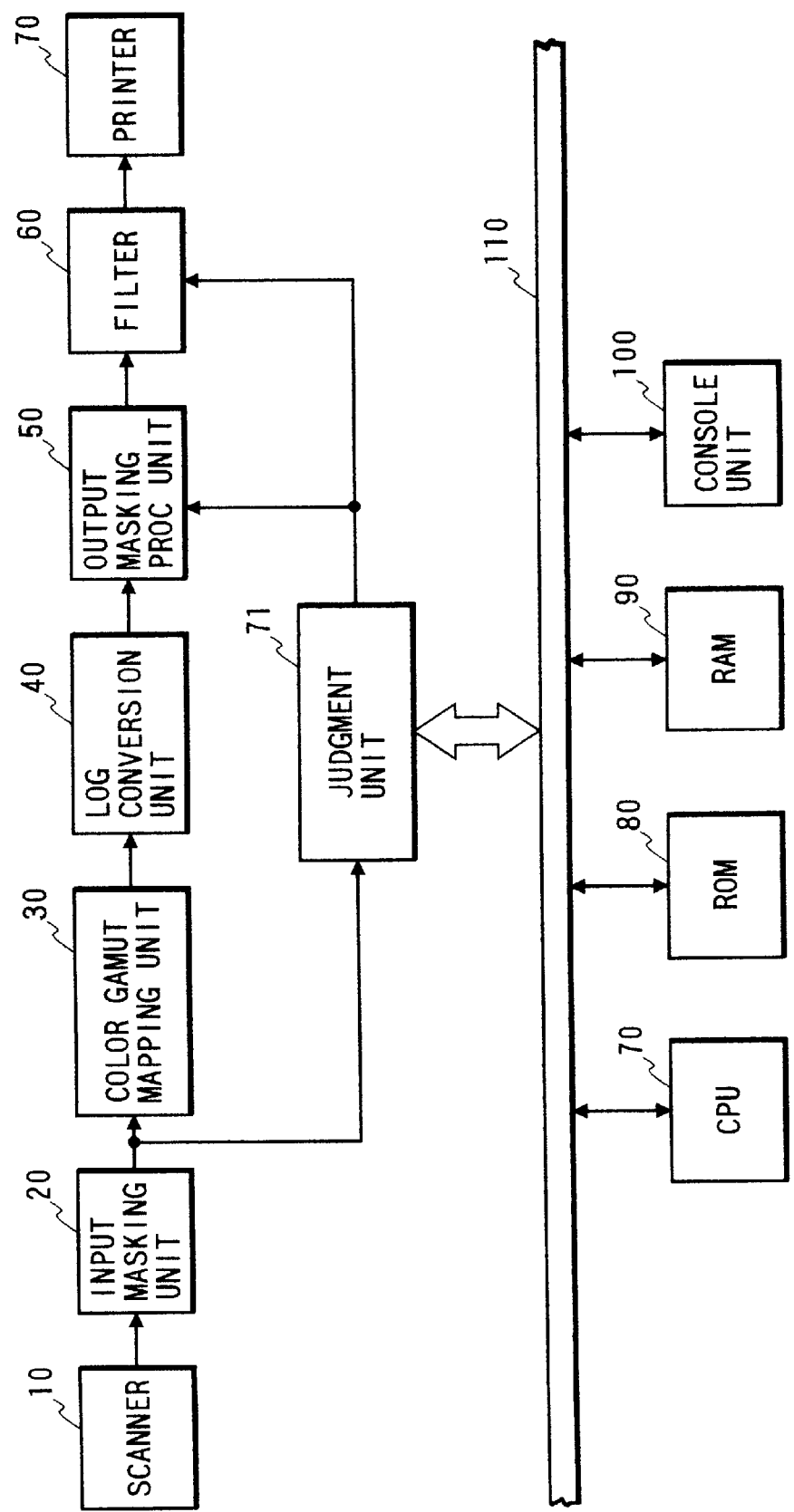
FIG. 1 is a block diagram showing the structure of an image processing apparatus according to the embodiments of the present invention.

FIG. 1 is a block diagram showing the structure of an image processing apparatus according to the first embodiment of the present invention.

A scanner unit 10 scans an original to produce color image data which is composed of R, G and B components representing the scanned original. The obtained image data depends on a spectral characteristic of a CCD which is included in the scanner unit 10. Therefore, an input masking unit 20 coverts the color image data into color image data in a predetermined RGB color space (e.g., NTSC color space, RGB color space or the like). A color gamut mapping unit 30 performs a color gamut mapping process for the color image data on which an input masking process has been performed, on the basis of the following matrix calculation equation (1).

$$\begin{bmatrix} dR \\ dG \\ dB \end{bmatrix} = \begin{bmatrix} a_{11} & a_{12} & a_{13} & a_{14} & a_{15} & a_{16} & a_{17} & a_{18} \\ a_{21} & a_{22} & a_{23} & a_{24} & a_{25} & a_{26} & a_{27} & a_{28} \\ a_{31} & a_{32} & a_{33} & a_{34} & a_{35} & a_{36} & a_{37} & a_{38} \end{bmatrix} \begin{bmatrix} R-X \\ G-X \\ B-X \\ (R-X)\cdot(G-X) \\ (G-X)\cdot(B-X) \\ (B-X)\cdot(R-X) \\ R\cdot G\cdot B \\ (255-R)(255-G)(255-B) \end{bmatrix} \quad (1)$$

where x represents min (R, G, B).

On the other hand, in a case where a black/white mode is set by a console unit 100 and in a case where a mode to form an image by using a monochromatic recording material is set by the console unit 100, the color gamut mapping process is made through and also a matrix coefficient of an output masking process unit 50 is set to a matrix coefficient which is used for producing density data based on spectral luminous efficiency, and then the density data is produced from the logarithmic-converted color image data.

The color image data on which the color gamut mapping process has been performed is then converted into color image data which is composed of Y, M and C components, by a logarithmic conversion unit 40. Then, an output masking process and a filter process are respectively performed for the obtained color image data by the output masking process unit 50 and a filter 60, and thereafter the processed data is output to a printer 70, whereby the image is formed on a recording medium by using Y, M, C and K recording materials.

A judgment unit 71 performs edge detection and saturation judgment for the color image data on which the input masking process has been performed, in order to judge whether a pixel represented by the color image data represents a character portion or an image portion.

The output masking process unit 50 and the filter 60 perform the processes according to a kind of each pixel, on the basis of a judged result of the judgment unit 71.

That is, in a case where a target pixel represents a black character, the output masking process to increase an under color removal (UCR) quantity and a black generation quantity is performed, and also the filter process to perform edge emphasis for increasing a K-component level of a black edge portion is performed. By these processes, the black character can be mainly recorded by a black toner, whereby a blur in color can be suppressed. Further, since the edge emphasis is performed, an edge portion of a character can be made vivid.

On the other hand, in a case where the target pixel represents an image, the masking process to increase tonality or gradation and color reproducibility is performed, and also the filter process including a smoothing process is performed for the image which is formed by printed dots or the like. By these processes, a moire can be suppressed and thus high-quality image reproduction can be performed.

Each of the above-described process units is controlled by a CPU 70 which is connected via a bus 110. A color gamut mapping coefficient, an output masking coefficient and a filter coefficient are set by the CPU 70 on the basis of the setting at the console unit 100, an image signal distribution and a color distribution of the original, and the like.

The CPU 70 controls each process unit and calculates to set each coefficient, on the basis of a program stored in a ROM 80 and by using a RAM 90 as a work memory.

Figure 3:
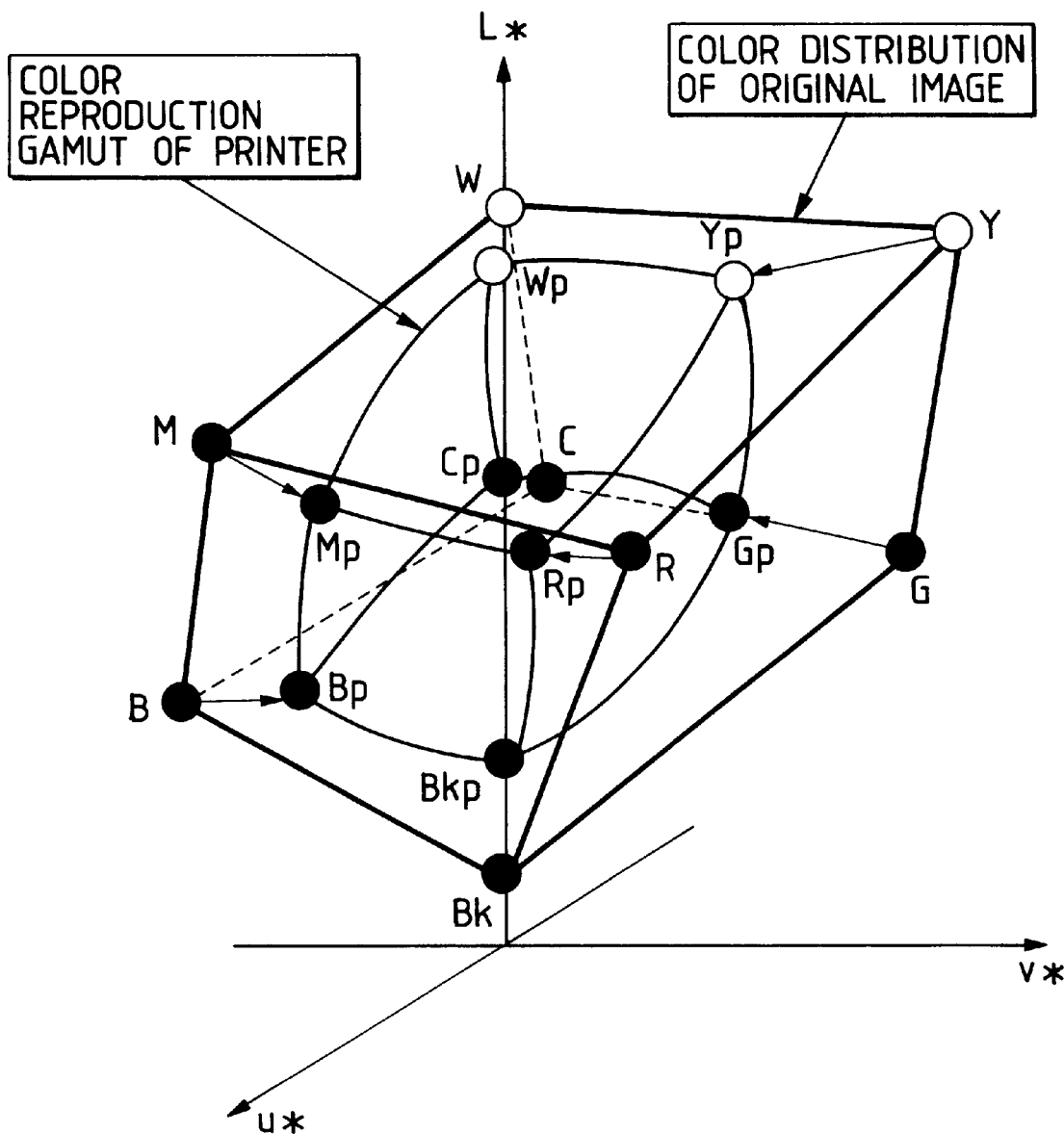
FIG. 3 is a view for explaining a color reproduction gamut.

Initially, the color gamut mapping process will be explained hereinafter. The the printer 70, has previously determined a color reproduction gamut (or color reproduction range) which is a color gamut (or color range) capable of performing color reproduction on the basis of characteristics of the C, M, Y and K recording materials and the like. In this case, since the color reproduction gamut of the printer 70 does not include all of the actually-existing colors, it is possible that the color existing on the original exists outside the color reproduction gamut of the printer 70, as shown in FIG. 3. The color gamut mapping process is used to convert or transform the color outside the color reproduction gamut into a color which is within the color reproduction gamut and whose tint is closest to that of the color outside the gamut, such that a color tint or a reproduction image becomes closer to that of the original.

In the color space compression process according to the present embodiment, as shown in FIG. 3, an outer-most color (i.e., high saturation portion) corresponding to each of the R (red), G (green) and B (blue) components (i.e., secondary colors), the C (cyan), M (magenta) and Y (yellow) components (i.e., primary colors), a K (dark) component and a W (highlight) component of the original which component exists outside the color reproduction gamut is detected, and then compression is performed such that these eight color components are converted into the eight color components representing the color reproduction gamut of the printer 70.

Figure 2:
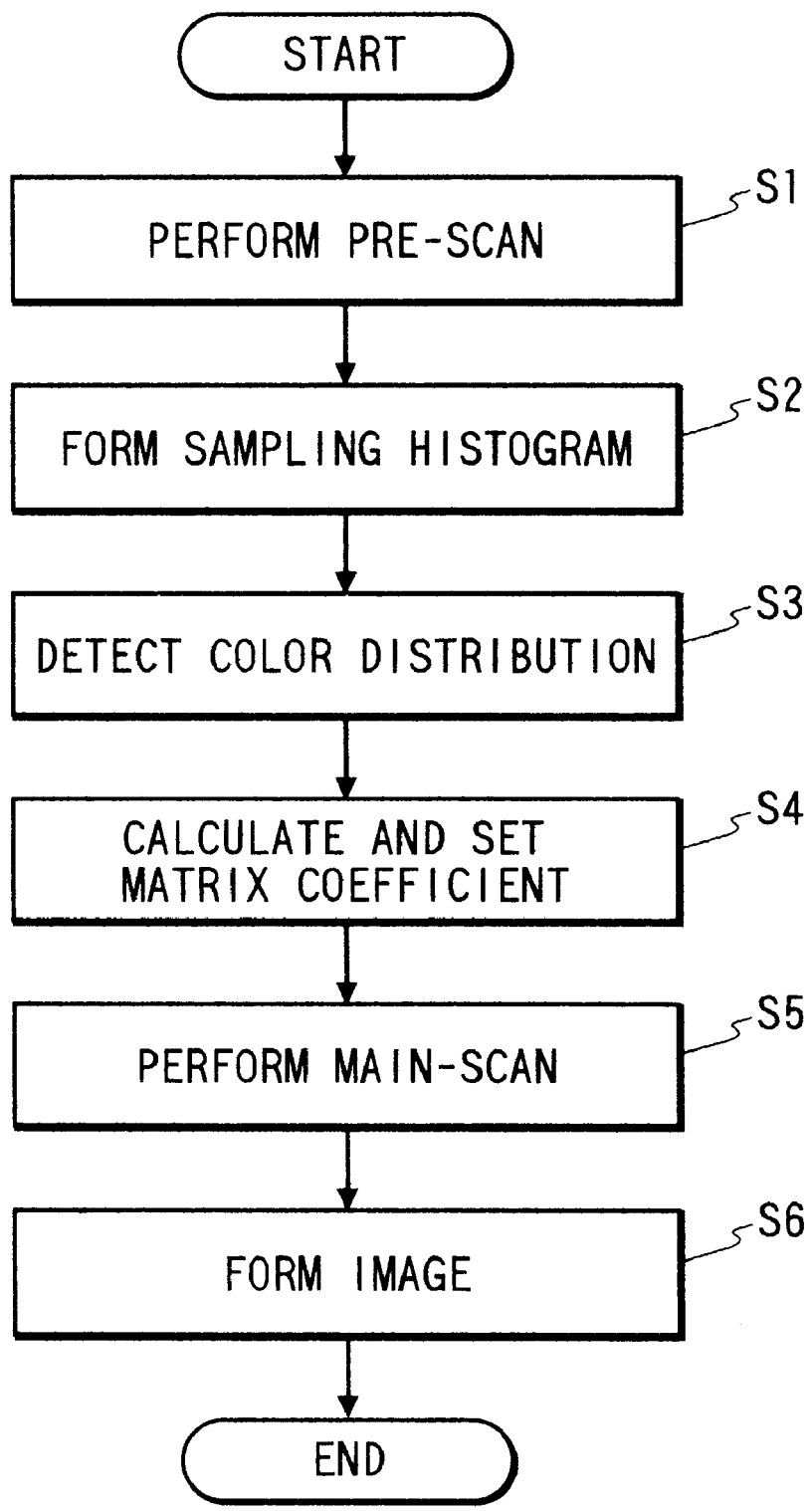
FIG. 2 is a flow chart showing an example of a flow of a color gamut mapping process.

Subsequently, a method of setting the color gamut mapping coefficient in the equation (1) will be explained. This method corresponds to processes in steps S1 to S5 in the sequence of the present embodiment shown in FIG. 2.

Initially, the original is pre-scanned (step S1). Then, on the basis of the obtained color image data, a histogram is formed according to the magnitude of an image signal by the CPU 70 (step S2). Subsequently, a substrate level (i.e., highlight portion W) is firstly detected, whereby the ground levels of the R, G and B color image data are stored respectively as RW, GW and BW (=(RGB)W). Then, the color distribution of the color signal (outer-most color) of which saturation is highest is detected from among the color signals outside the color reproduction gamut of a color output unit, for each of the basic primary colors (R, G, B, C, M, Y). The detected color distributions are respectively stored in forms of (RGB)R, (RGB)G, (RGB)B, (RGB)C, (RGB)M, (RGB)Y (=(RGB)L: L=1 to 6), for the respective basic primary colors. Further, a dark level is detected. For example, from among the signals of which R, G and B components are equal to or less than predetermined values $R_{PD}$, $G_{PD}$ and $B_{PD}$ respectively, such as $R<R_{PD}$ and $G<G_{PD}$ and $B<B_{PD}$, the minimum signal is stored as the dark level $(RGB)_D$ (Bk in the original). In this case, the values $R_{PD}$, $G_{PD}$ and $B_{PD}$ respectively represent the R, G and B signals of the most-deep black color which is a color reproducible by the image processing apparatus according to the present embodiment (step S3).

Subsequently, in the step S4, a matrix calculation coefficient is obtained. That is, in the matrix calculation equation (1), 24 values of the detected substrate level $(RGB)_W$, the color distribution $(RGB)_L$ and the dark level $(RGB)_D$ are considered as the values R, G and B obtained before the conversion. Further, if maximum levels reproducible by a printer for the respective values have been previously stored as targets and these values are considered as values R', G' and B' obtained after the conversion by the matrix calculation equation (1), 24 simultaneous linear equations can be respectively obtained. Therefore, by solving these equations, the matrix calculation coefficient is calculated.

The eight kinds and 8×3=24 of R, G and B signals detected in the color distribution detection (step S3) are the image signals which are outside the color reproduction gamut or in which a substrate is fogged.

For example, it will be explained a case where the substrate level has the values R=240, G=240 and B=235. It should be noted that essentially a white level ideally has the values R'=255, G'=255 and B'=255.

Further, for example, it is assumed that the outer-most color of red is represented by the signal having the values R=200, G=15 and B=0, but the highest-saturation red within the color reproduction gamut of a hard copy is usually represented by the values R'=160, G'=20 and B'=10.

The object of the above-described matrix conversion is to map the detected outer-most color into the color reproduction gamut of the hard copy. Therefore, the above values R, G and B may be converted into the values R', G' and B' by the matrix conversion.

If such a correlation or correspondence is set or applied for all of eight colors, i.e., the white level (one color), a color space distribution (Y, M, C, R, G, B: six colors) and a black level (one color), the 24 simultaneous linear equations can be obtained. Also, there are 24 matrix coefficients $a_{ij}$ as unknown quantities, whereby the 24 simultaneous linear equations can be unambiguously solved to determine the matrix coefficients. An example of the correlation is shown as follows:

within the color reproduction gamut without losing the tonality and color continuity out of the color reproduction gamut.

The color gamut mapping process and the like are performed on the color image data which is obtained by performing main scan (step S5) using the color gamut mapping coefficient set in the above-described manner, so as to form the image (step S6).

The logarithmic conversion unit 40 converts the color image data which is composed of the R, G and B components (i.e., luminance signal output from the color gamut mapping unit), into the color image data which is composed of the Y, M and C components (i.e., density signal), by using following equations (2).

$$C = 255/D\text{max} \times \text{Log}_{10}(R/255)$$

$$M = 255/D\text{max} \times \text{Log}_{10}(G/255)$$

$$Y = 255/D\text{max} \times \text{Log}_{10}(B/255) \qquad (2)$$

In the logarithmic conversion represented by the equations (2), the color image data corresponding to the value Dmax is converted into 255 values (i.e., maximum values in eight bits), in order to faithfully reproduce an original density.

According to such logarithmic conversion, the color image data on which the color gamut mapping process is not performed can be converted into color image data which faithfully reproduces the color in the original (i.e., a color within color reproduction gamut), which color has a density equal to or less than the value Dmax. However, as indicated by (A) in FIG. 4, the tonality (or gradation) of the color in the original having a density equal to or larger than the value Dmax is lost.

Figure 4:
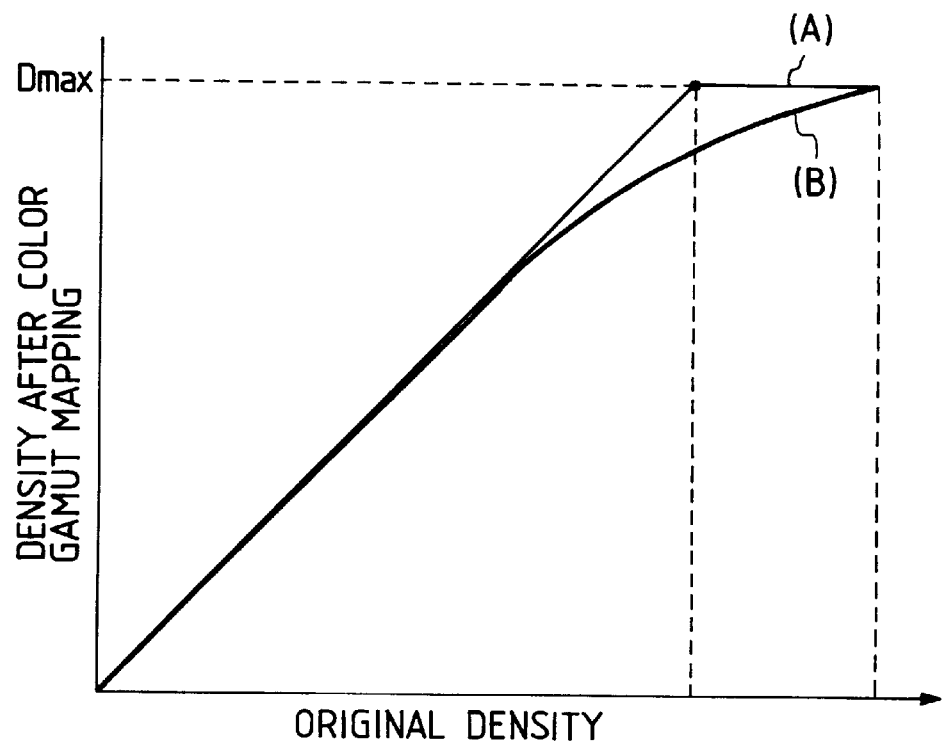
FIG. 4 is a view showing a result of the color gamut mapping process.

On the other hand, in case of performing the color gamut mapping process, as indicated by (B) in FIG. 4, the color

|  | detection level |  |  |  | target |  |  |  |
|---|---|---|---|---|---|---|---|---|
| white: | R = 240 | G = 240 | B = 235 | → | = R' = 255 | G' = 255 | B' = 255 | substrate detection |
| red: | R = 200 | G = 15 | B = 0 | → | = R' = 160 | G' = 20 | B' = 10 | |
| green: | R = 10 | G = 220 | B = 5 | → | = R' = 20 | G' = 100 | B' = 20 | |
| blue: | R = 0 | G = 10 | B = 180 | → | = R' = 10 | G' = 10 | B' = 100 | color distribution |
| cyan: | R = 10 | G = 180 | B = 220 | → | = R' = 10 | G' = 95 | B' = 200 | detection |
| magenta: | R = 230 | G = 10 | B = 190 | → | = R' = 200 | G' = 10 | B' = 90 | |
| yellow: | R = 255 | G = 250 | B = 0 | → | = R' = 255 | G' = 250 | B' = 90 | |
| black: | R = 3 | G = 3 | B = 3 | → | = R' = 8 | G' = 8 | B' = 8 | dark detection |

By procedures described above, the color gamut mapping coefficients capable of performing the desired conversion for all the substrate levels, the color gamut mapping and the dark level can be obtained.

According to the present embodiment, the color gamut mapping process including a substrate level (highlight portion) correction and a dark level correction can be collectively realized by the matrix conversion. Further, in the process, one correction does not affect other correction, whereby an excellent image can be output.

Furthermore, since the color gamut mapping process is performed by using a matrix calculation, a color out of the color reproduction gamut can be converted into a color image data representing the maximum density of the original is converted into the color image data representing the value Dmax, the image can be reproduced while maintaining the tonality at the high-density portion.

The output masking process unit 50 converts the color image data composed of the Y, M and C components into the color image data composed of the Y, M, C and K components, on the basis of the characteristics of the Y, M, C and K recording materials used in the printer unit 70.

Generally, in the printer unit 70, a total quantity of the recording materials by which the image formation can be excellently performed is limited due to properties of the recording materials and process conditions, whereby it is necessary to restrict the total quantity of the recording materials in order to normally operate the printer unit 70 and maintain the quality of the formed image.

Therefore, in the present embodiment, the total quantity of the recording materials is restricted on the basis of the masking coefficient in the output masking process unit 50, the coefficient as to the UCR quantity and the coefficient as to the black generation quantity.

The masking coefficient in the output masking process unit 50, the coefficient as to the UCR quantity and the coefficient as to the black generation quantity are set on the basis of the color reproducibility depending on the characteristics or the like of the recording materials and the restriction in the total quantity of the recording materials.

Figure 5:
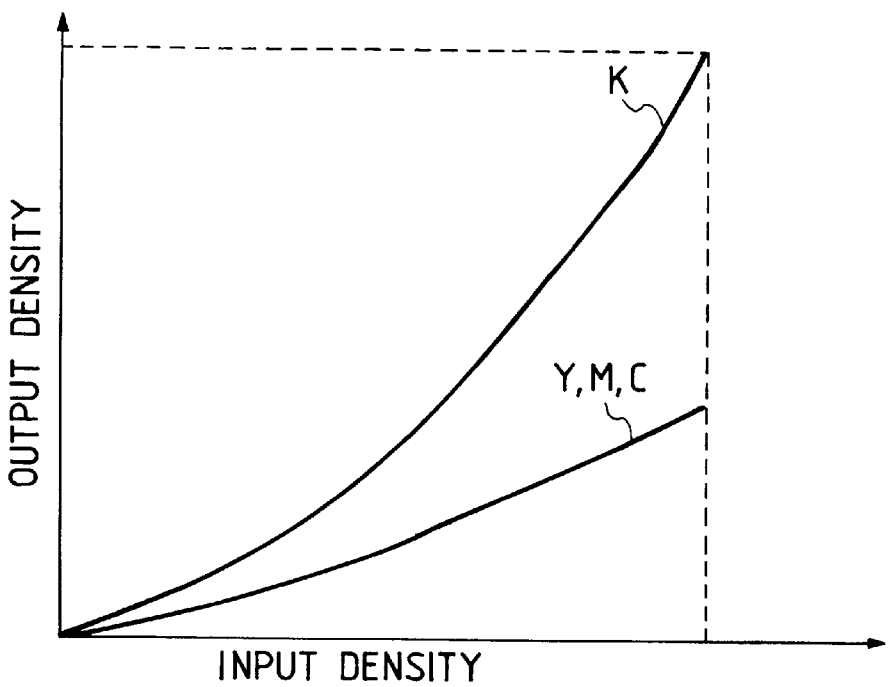
FIG. 5 is a view showing a result of an under color process (under color removal (UCR) and black generation)

In FIG. 5 showing a relation between input and output densities, as a processed result in the output masking process unit 50, the value of the K component and the values of the Y, M and C components are represented by gentle curves.

According to the relation shown in FIG. 5, as a result of the masking process by the output masking process unit 50, in the plural-color mode, the density tends to be higher than the density value after the color gamut mapping.

On the other hand, in the monochromatic mode, as described above, the output masking process unit 50 merely performs the matrix calculation to produce the density data corresponding to the spectral luminous efficiency from the C, M and Y data, i.e., the density signals. Therefore, in the monochromatic mode, since the masking process, the UCR process and the black generation process are not performed, the density of the input color image data is faithfully reflected on the output density to be copied.

Therefore, in order to prevent decrease in density due to the color gamut mapping process, the color gamut mapping process is forcibly made in the monochromatic mode.

The color gamut mapping process is controlled by the CPU 70. That is, the CPU 70 automatically controls whether or not the color gamut mapping process is to be performed on the basis of whether the black/white mode was set or the monochromatic mode was set.

Further, in order to maintain the color continuity, the color gamut mapping process is performed for the entire original by using the same color gamut mapping coefficient.

On the contrary, the judgment unit 71 judges the kind of each pixel to set the output masking process and the filter process.

Therefore, in a case where the color gamut mapping process is used, the output masking process and the filter process are performed on the original which includes the high-density portion and the black character portion, since the color gamut mapping process is performed on the entire original, the density of the black character portion is deteriorated. However, in this case, since the process for the black character portion is set in the output masking process and the filter process, the density of the black character portion is preserved and thus its edge is emphasized. Therefore, the high-density tonality or gradation can be excellently reproduced by the color gamut mapping process, and also the black character portion can be excellently reproduced by the masking process and the filter process such that the black character portion is clearly edge-emphasized.

As explained above, according to the first embodiment, a color gamut mapping process suitable for each of the plural-color mode and the monochromatic mode can be performed, whereby an image process can be performed by which high-quality image can be obtained.

Further, since the color gamut mapping process can be controlled for each target image and the spatial frequency characteristic can be controlled for each image data, the color process can be controlled in a unit of a process according to the characteristic of each process, whereby the image process can be finely controlled to obtain a high-quality image.

Second Embodiment

In the above-described first embodiment, the color gamut mapping process coefficient is automatically set on the basis of the color distribution of the original. However, for example, the color gamut mapping process coefficient may be manually fine-adjusted by a user. That is, it is possible that the user finely adjusts the degree of the color gamut compression for each color and then converts the target on the basis of the adjusted result to reflect the adjusted result on the color gamut mapping coefficient.

In the second embodiment, the color gamut mapping coefficient in the color gamut mapping unit 30 is set such that the user's manual instruction can be reflected on the color gamut mapping coefficient.

Figure 6:
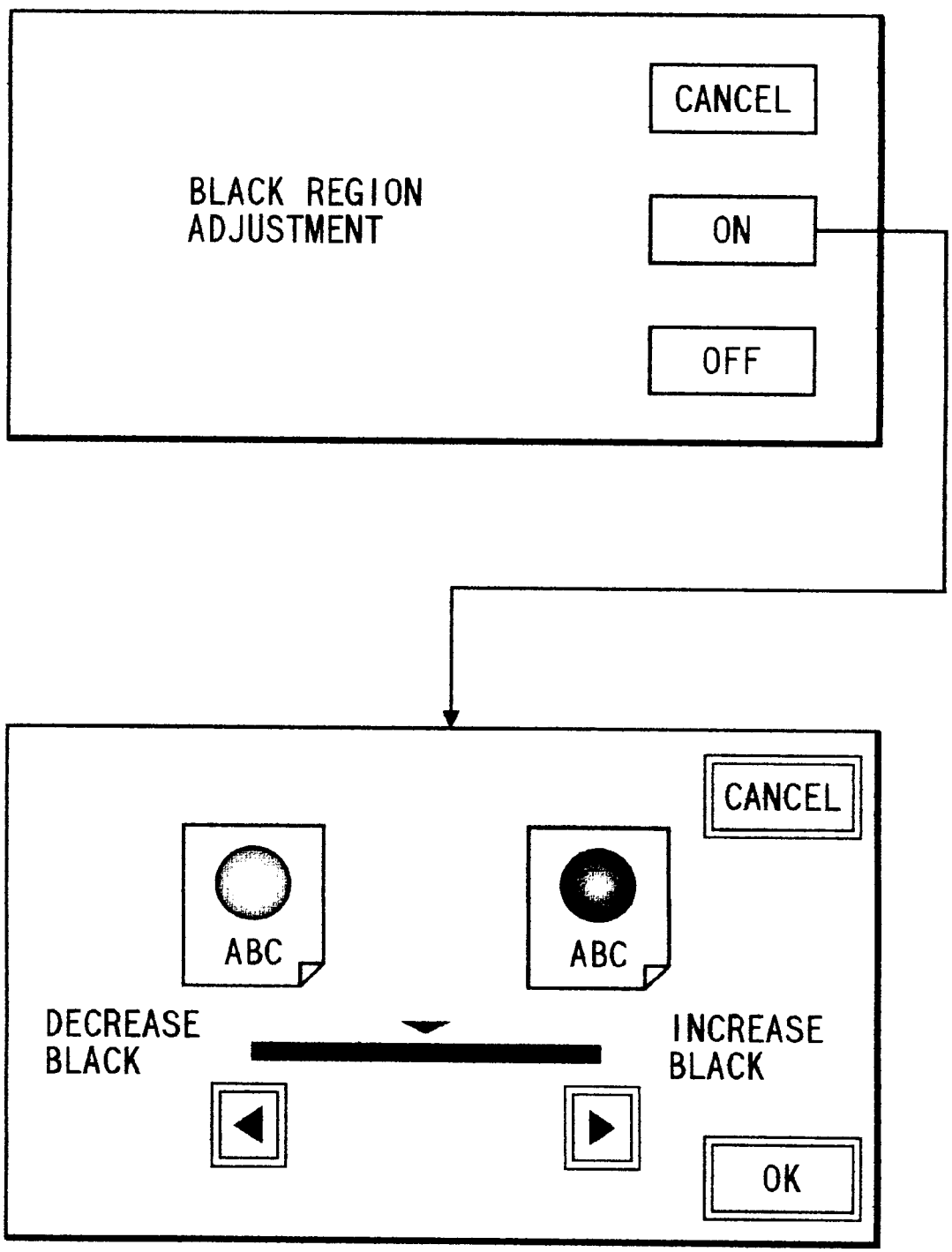
FIG. 6 is a view showing an example of an operation image plane for setting a degree of a black region adjustment.

In the second embodiment, the full-color mode or the monochromatic mode can be set, and it also can be set whether or not the color gamut mapping process is to be performed in case of setting the full-color mode. In addition, as shown in FIG. 6, at degree of black region adjustment can be instructed at the console unit 100.

The black region adjustment is used to control tonality or gradation of the dark portion in the output image, which portion corresponds to the point Bkp and its peripheral range shown in FIG. 3.

If the black is set to be weaker than a default value, the tonality of the dark portion in the input image can be normally or excellently reproduced. However, in this case, there is some fear that the portion such as the black character or the like which is desired to be reproduced in solid black is reproduced tonally or gradationally. This is because of color inconsistencies in the black character portion due to a reading error generated when the original is read by the scanner.

On the other hand, if the black is set to be harder than the default value, the black character portion in the input image can be normally or excellently reproduced. However, in this case, there is some fear that the tonality of the dark portion in the output image is lost.

In the present embodiment, the degree of black region adjustment is set on a console image plane shown in FIG. 6, whereby the color reproduction characteristic of the dark portion in the output image can be arbitrarily adjusted.

Hereinafter, a method for setting the color gamut mapping coefficient according to the black region adjustment will be explained in detail.

Initially, R, G and B components in the black level of the original detected based on the histogram are changed in accordance with the setting degree of black region adjustment.

In the case where the black was set to be weaker than the default value, the black level of the original is made smaller. That is, in FIG. 3, the value of the point Bk is changed or shifted downwardly along the L* axis.

On the other hand, in the case where the black was set to be harder than the default value, the value of the black level of the original is made larger. That is, in FIG. 3, the value of the point Bk is changed or shifted upwardly along the L* axis.

By changing the black level of the original in such a manner as above, the color gamut mapping coefficient in the correction of the dark portion can be changed, whereby the compressibility for the dark portion can be controlled. In the case where the black was set to be weaker than the default value, the compressibility for the dark portion is made larger, while in the case where the black was set to be harder than the default value, the compressibility for the dark portion is made smaller.

In any case, in the color gamut mapping coefficient, the coefficient for the dark portion may be stored in correspondence with the degree of black region adjustment.

Further, the coefficient for the dark portion to be stored may be expressed by using not only a positive value but also a negative value. By using the negative value, degree of emphasis for the dark portion can be significantly harder, whereby, i.e., the black character can be more clearly reproduced.

Furthermore, application of such change is not limited to the dark portion. That is, by changing each of the detected R, G, B, C, M, Y and W levels of the original on the basis of the manual instruction, it is possible to be able to perform hue and saturation adjustments.

As described above, according to the second embodiment, the color adjustment can be performed by the matrix calculation which is used for the color gamut mapping process. Therefore, an arbitrary color adjustment can be performed while maintaining the color continuity.

Other Embodiments

In the above-described embodiments, the method shown in FIG. 3 is used as the color gamut mapping method. However, another method may be used in which the input image data is color-gamut mapped into the color reproduction gamut by preserving a hue of the input image data and changing saturation and lightness (luminousity) thereof.

Further, in the above-described embodiments, whether or not the color gamut mapping is to be performed for one page as a whole is controlled. However, for example, in a case where an image region, a character graphic (CG) region, a character region and the like of whose characteristics are different from others are included in an image corresponding to one page, it may be possible to set whether or not the color gamut mapping is to be performed for each region.

Furthermore, in the above-described first embodiment, the color gamut mapping is controlled to be performed in the plural-color mode and not to be made in the monochromatic mode. However, for example, the following control may be performed. That is, in the plural-color mode, the color gamut mapping is performed in the same manner as in the first embodiment. On the other hand, in the monochromatic mode, there is no limit to the target at the dark point.

Furthermore, in the above-described embodiments, the masking process is used as the color reproduction process. However, for example, another color reproduction process may be used such as a direct mapping process using a table.

The present invention can be applied to a system constructed by a plurality of equipments (e.g., host computer, interface equipment, reader, printer and the like) or can also be applied to an apparatus comprising one equipment (e.g., copy machine, facsimile machine).

It will obviously be understood that the present invention also incorporates a case where a memory medium for storing a software program to realize the present invention is applied to the system or the apparatus and then such system or apparatus reads and executes the program stored in the memory medium to realize present invention. As such the memory medium to store the program, e.g., it is possible to use a floppy disk, a hard disk, an optical disk, an optomagnetic disk, a CD-ROM, a CD-R, a magnetic tape, a non-volatile memory card, a ROM or the like.

Although the present invention has been described above with respect to the preferred embodiments, the present invention is not limited to the foregoing embodiments but many modifications and variations are possible within the spirit and scope of the appended claims.

What is claimed is:

1. An image processing apparatus comprising:

input means for inputting image data representing a target image;

color gamut mapping means for performing a color gamut mapping process;

color reproduction process means for performing a color reproduction process;

judgment means for judging whether a monochromatic mode for forming an image on a recording medium by using a recording material is set; and control means for controlling said color gamut mapping means and said color reproduction process means, wherein when said judgment means judges that said monochromatic color mode is set, said control means inhibits said color gamut mapping means from performing a color mapping process on the input image data.

2. An apparatus according to claim 1, further comprising spatial frequency characteristic conversion means for converting a spatial frequency characteristic of the input image data.

3. An apparatus according to claim 1, further comprising color mode setting means for setting a plural-color mode or the monochromatic mode on the basis of a manual operation.

4. An apparatus according to claim 1, wherein the color reproduction process is performed by using a table.

5. An apparatus according to claim 1, wherein said color gamut mapping means further comprises detecting means for detecting a color distribution of the target image; and generating means for generating a color gamut mapping parameter on the basis of the detected color distribution and a color reproduction gamut of image formation means.

6. An apparatus according to claim 5, wherein said detecting means detects a dark level and a highlight level in the target image.

7. An apparatus according to claim 5, wherein said detecting means detects an outer-most color of each of R, G, B, C, M and Y color components of the target image.

8. An image processing method comprising:

an input step of inputting image data representing a target image;

a color gamut mapping step of performing a color gamut mapping process;

a color reproduction process step of performing a color reproduction process;

a judgment step of judging whether a monochromatic mode for forming an image on a recording medium by using a recording material is set; and a control step of controlling said color gamut mapping step and said color reproduction process step, wherein when said judgment step judges that said monochromatic color mode is set, said control step inhibits said color gamut mapping step from performing a color mapping process on the input image data.

* * * * *

UNITED STATES PATENT AND TRADEMARK OFFICE
CERTIFICATE OF CORRECTION

PATENT NO.   : 5,907,415
DATED        : May 25, 1999
INVENTOR(S)  : Takashi Yabe It is certified that error appears in the above-identified patent and that said Letters Patent is hereby corrected as shown below:

Column 1,
Line 12, "it has been thought" should read -- there has been considered --.

Column 2,
Line 58, "coverts" should read -- converts --.

Column 3,
Line 18, "made through" should read -- performed --;
Line 38, "a kind of each pixel" should read -- each kind of pixel --; and
Line 67, "The the" should read -- The --; and "70," should read -- 70 --.

Column 4,
Line 49, "of" (second occurrence) should read -- whose --; and
Line 50, "which" should be deleted.

Column 5,
Line 15, "it will be explained a case" should read -- a case will be explained --;
Line 44, "R=O G=10 B=180 → - R' = 10" should read -- R=O G=10 B=180 → R' = 15 --; and
Line 47, "→ R' =255 G' =250 B' =90" should read -- → R' =255 G' =250 B' =10 --.

Column 8,
Line 18, "at" should read -- a --.

Column 9,
Line 24, "(luminousity)" should read -- (luminosity) --;
Line 28, "of" should be deleted; and
Line 54, "present invention. As such the" should read -- the present invention. As a --.

UNITED STATES PATENT AND TRADEMARK OFFICE
CERTIFICATE OF CORRECTION

PATENT NO. : 5,907,415
DATED : May 25, 1999
INVENTOR(S) : Takashi Yabe

It is certified that error appears in the above-identified patent and that said Letters Patent is hereby corrected as shown below:

Column 10,
Line 41, "outer-most" should read -- outermost --.

Signed and Sealed this

Eighth Day of March, 2005

JON W. DUDAS
*Director of the United States Patent and Trademark Office*